United States Patent [19]

Doss et al.

[11] 4,101,482

[45] Jul. 18, 1978

[54] SEALANT BASED ON MIXTURE OF UNSATURATED AND HYDROGENATED BLOCK COPOLYMERS

[75] Inventors: Richard C. Doss; Edward L. Walton, both of Bartlesville, Okla.

[73] Assignee: Phillips Petroleum Company, Bartlesville, Okla.

[21] Appl. No.: 729,549

[22] Filed: Oct. 4, 1976

[51] Int. Cl.² .......................... C08K 5/01; C08L 93/00
[52] U.S. Cl. ........................ 260/27 BB; 260/33.6 A; 260/42.47
[58] Field of Search .......... 260/27 BB, 33.6 A, 42.47, 260/876 B

[56] References Cited

U.S. PATENT DOCUMENTS

| | | | |
|---|---|---|---|
| 3,523,493 | 8/1970 | Berry et al. | 260/876 B |
| 3,658,740 | 4/1972 | Marrs et al. | 260/876 B |
| 3,676,386 | 7/1972 | Brenner et al. | 260/876 B |
| 3,766,295 | 10/1973 | Crossland et al. | 260/876 B |
| 3,792,005 | 2/1974 | Harlan | 260/33.6 A |
| 3,823,203 | 7/1974 | De La Mare | 260/876 B |

OTHER PUBLICATIONS

Morton–Rubber Technology (2nd ed.), (Van Nostrand) (New York) (1973), pp. 528–530.

*Primary Examiner*—Donald E. Czaja
*Assistant Examiner*—H. H. Fletcher

[57] ABSTRACT

A mixture of an unsaturated block copolymer and a hydrogenated thermoplastic elastomer in combination with a modifying resin and a filler provides a sealant formulation having good flexibility, low tack, and low melt viscosity without a sacrifice in other properties.

10 Claims, No Drawings

SEALANT BASED ON MIXTURE OF UNSATURATED AND HYDROGENATED BLOCK COPOLYMERS

BACKGROUND OF THE INVENTION

This invention relates to polymer sealant compositions.

It is known to use polymers in sealant compositions, However, the whole field of sealant compositions is one of compromising between competing desirable properties. That is, changing the formulation to give improved properties in one area results in deterioration of some other property. For instance, it is desired that the sealant be flexible, i.e., rubbery, so as not to become brittle after a period of years and to allow for normal expansion and contraction. Rubbery materials are obviously ideally suited in their inherent characteristics in this regard. However, because of the unsaturation in rubber it tends to become brittle on aging. It is readily apparent that it is desirable that the sealant adhere reasonably well to the sides of the joint or crack to which it is applied, yet after the sealant is cured it is undesirable for it to have a tacky exposed surface. Finally, it is desired that the sealant, in instances where a solvent base is used, have a relatively low bulk viscosity so as to facilitate the application; however, the use of increased percentages of solvent to achieve this low viscosity results in undesirable shrinkage when the solvent evaporates, once again an example of having to accept a deterioration in one property in order to get an improvement in another.

SUMMARY OF THE INVENTION

It is an object of this invention to provide a sealant formulation having good flexibility and the ability to withstand weathering;

It is a further object of this invention to provide a sealant formulation which has good adhesion and yet which, on curing, is not tacky; and It is yet a further object of this invention to provide the sealant formulation having low bulk viscosity in solvent-based formulations yet exhibiting low shrinkage.

In accordance with this invention, there is provided a mixture of an unsaturated block copolymer and a hydrogenated thermoplastic elastomer containing a modifying resin and a filler.

DESCRIPTION OF THE PREFERRED EMBODIMENTS

This invention pertains to a new sealant formulation based on a mixture of a conjugated diene/monovinyl aromatic block hydrocarbon copolymer and a hydrogenated linear or radial teleblock hydrocarbon copolymer of a conjugated diene and a monovinyl aromatic. This mixture contains in addition a modifying resin, and a filler. Other possible ingredients include plasticizers, pigments, solvents, stabilizers and the like.

The inventive sealant formulations exhibit lower bulk viscosities than comparable formulations based on a single block copolymer which is either hydrogenated or unhydrogenated. The lower bulk viscosities allow more convenient application of the inventive sealant to the substrate. If the inventive sealant is applied as a hot melt, a lower application temperature is required; if applied as a solvent-release system, lower solvent level is needed thus resulting in lower subsequent shrinkage of the applied sealant, less void formation and more economical application.

Block copolymers of conjugated dienes and monovinyl-substituted aromatics generally useful as the unsaturated block copolymer component of this invention are of the structure AB, ABA or $(AB)_nY$ wherein A represents a block of poly(monovinyl aromatic), B represents a block of poly(conjugated diene), Y represents a residue of a polyfunctional coupling agent or a polyfunctional initiator and $n$ is an integer having a value of from 2 to 4. A and B generally represent pure homopolymer blocks, but it is also within the scope of this invention to include those block copolymers containing the well-known "tapered" blocks. The thermoplastic elastomer ABA or $(AB)_nY$ polymers are preferred. By thermoplastic elastomer is meant a copolymer which exhibits elastic properties in the solid state without chemical curing and is thermoplastic.

Monovinyl-substituted aromatic monomers useful in the preparation of the A blocks of the above-described copolymers generally contain from 8 to 12 carbon atoms per molecule. Examples of such hydrocarbon monomers include styrene, 3-methylstyrene, 4-n-propylstyrene, 1-vinylnaphthalene, 2-vinylnaphthalene and the like. Styrene is preferred.

Useful conjugated dienes for the preparation of the B blocks of the above-described copolymers include those generally containing from 4 to 8 carbon atoms per molecule. Examples of such hydrocarbon monomers include 1,3-butadiene, isoprene, 1,3-pentadiene, 2,4-hexadiene, 3-ethyl-1,3-pentadiene, and the like. 1,3-Butadiene and isoprene are preferred.

AB polymers are prepared by methods well known in the solution polymerization art such as by organomonolithium initiation of a solution of a monovinyl aromatic and a conjugated diene in the absence of randomizing agent to give a tapered AB block copolymer or by the sequential addition of the monomers to a system utilizing an organomonolithium initiator to give an AB block copolymer with pure homopolymer blocks. ABA block copolymers are also prepared by methods well known in the art such as by the sequential addition of monomers to a system utilizing an organomonolithium initiator as described in U.S. Pat. No. 3,639,521, the disclosure of which is hereby incorporated by reference.

$(AB)_nY$ block copolymers are prepared using polyfunctional organolithium initiators or polyfunctional coupling agents by well-known methods such as are adequately described in U.S. Pat. Nos. 3,030,346; 3,251,905; 3,281,383 and 3,639,521, the disclosures of which are hereby incorporated by reference.

When Y is a residue of a polyfunctional coupling agent, it is derived from treating agents containing from 2 to 4 functional groups per molecule. Useful coupling agents include polyepoxides, polyimines, polyisocyanates, polyaldehydes, polyketones, polyesters, polyanhydrides and polyhalides. Specific examples of such agents include benzene-1,4-diisocyanate, naphthalene-1,2,5,7-tetraisocyanate, tri(1-aziridinyl)phosphine oxide, epoxidized soybean oil, epoxidized linseed oil, 1,4,7-naphthalene tricarboxaldehyde, 1,4,9,10-anthracenetetrone, pyromellitic dianhydride, trimethyl tricarballylate, dichlorodimethylsilane and silicon tetrachloride.

When Y is a residue of a polyfunctional initiator, it is derived from compounds of general formula $R(Li)_x$ where x is an integer of from 2 to 4 and R is an aliphatic, cycloaliphatic or aromatic hydrocarbyl radical containing from 1 to 20 carbon atoms. Specific examples of useful polyfunctional initiators include dilithiomethane, 1,4-dilithiobutane, 1,20-dilithioeicosane, 1,2-dilithio-1,2-diphenylethane, 1,4-dilithiocyclohexane, 1,3,5-trilithiopentane, 1,2,5-trilithionaphthalene, 1,3,5,8-tetralithiodecane and 1,2,3,5-tetralithiocyclohexane.

The A/B weight ratio in the above-described polymers will generally be in the range of 50/50 to 5/95 and preferably in the range 40/60 to 15/85. The block copolymers will generally have a weight average molecular weight in the range of 10,000 to 750,000 and preferably 50,000 to 350,000. Thus, with at least half, preferably more than half, diene content, the polymers are rubbery and contain unsaturation normally associated with such polymers.

The hydrogenated teleblock copolymers useful in the inventive sealant formulations are generally hydrogenated ABA and $(AB)_nY$ block copolymers wherein A, B, and Y and $n$ are as described above. The AB ratio is as described above, thus before hydrogenation these polymers are thermoplastic elastomers. Hence, this component is a hydrogenated thermoplastic elastomer. The weight average molecular weight of this component is from 10,000 to 750,000, preferably 50,000 to 200,000, slightly lower preferred range being the only difference between these plastomers and the unhydrogenated plastomers which are the preferred materials for the unsaturated block copolymer component.

Procedures for hydrogenating unsaturated polymers are well known in the art. An example of such a system which is convenient to employ is the catalytic hydrogenation of a polymer solution using a reduced nickel catalyst (such as triethylaluminum-nickel octoate). This is disclosed in U.S. Pat. No. 3,696,088, the disclosure of which is hereby incorporated by reference.

The hydrogenated block copolymers of this invention are generally hydrogenated to the extent that 5 percent or less of the original olefinic unsaturation remains and 5 percent or less of the original aromatic unsaturation has been removed by hydrogenation. It is preferred that 2 percent or less of the original olefinic unsaturation remains after hydrogenation.

Modifying normally solid resins which are useful in the sealant formulation of this invention are those which are well known in the sealant art, such as modified and unmodified rosin and rosin esters, esters of polymerized rosin, polyterpene resins, terpene-phenolic resins, coumaroneindene resins, diolefin-olefin resins, phenolaldehyde resins, alpha-methyl styrene copolymers such as alpha-methyl styrene/vinyl toluene copolymers, and the like.

Liquid materials which are generally known as plasticizers in the rubber, adhesive and sealant art are useful as plasticizers in the inventive sealant formulations. These generally include: the well-known low molecular weight polyolefins, such as polybutenes; oils, including naphthenic, paraffinic or aromatic; methyl ester of rosin; phthalate esters; polymeric esters; chlorinated hydrocarbons; and the like, and mixtures thereof.

Fillers which are well known in the art are likewise useful as fillers in the present invention. Examples of such fillers include calcium carbonate, aluminum silicate, clay, talc, kaolin, barytes, mica, silica, etc., and mixtures thereof. Such fillers frequently reinforce the sealant and are usually inorganic although organic fillers can also be used.

Pigments are frequently employed in the formulations of the present invention for the aesthetic value of the sealant as well as for their reinforcing properties. Any pigments can be employed to impart whatever coloration is desired to the final sealant. Carbon black and titanium dioxide are applicable pigments, for instance.

It is usually desirable to include stabilizers in the inventive formulations. Such stabilizers include the well-known antioxidants and antiozonants, as well as ultraviolet and thermal stabilizers. Two particularly suitable stabilizers are Cyasorb 1084, a substituted thiophenol aminonickel complex and NBC, nickel dibutylthiocarbamate. Hindered phenols, substituted phosphites, phenolic phosphites, dialkyl thiodipropionates, nickel dialkyldithiocarbamates and the like and mixtures thereof are examples of types of stabilizers which are particularly beneficial in the present invention. The compositions of this invention exhibit good stability due to the presence of the hydrogenated component.

When application of the inventive sealant formulation as a solvent-release system is desired, saturated aliphatic, saturated cycloaliphatic or aromatic hydrocarbons are conveniently employed as the solvent. Those common hydrocarbon solvents generally containing from 5 to 8 carbon atoms per molecule, such as pentane, hexane, heptane, octane, cyclohexane, benzene, toluene and the xylenes are especially useful. Most preferably, if a solvent is used at all, it is used in an amount within the range of 25 to 250 parts per 100 parts by weight of total block copolymers.

It is also within the scope of this invention to apply the inventive sealant to a substrate as a hot-melt in which case no solvent is employed or as an emulsion in which case water and suitable emulsifiers are employed.

The sealant formulations of this invention are useful in sealing a wide variety of substrates. All common materials of construction, such as glass, aluminum, steel, concrete, brick, rock, ceramic, wood, etc., can be sealed by use of the inventive sealant.

The above-described ingredients of the inventive formulation are generally employed in amounts given in the following recipe.

| Recipe | | |
|---|---|---|
| | Parts by Weight | |
| Ingredient | Broad | Preferred |
| Block copolymer | 5–50 | 25–40 |
| Hydrogenated thermoplastic elastomer | 50–95 | 60–75 |
| Modifying resin | 10–300 | 25–150 |
| Plasticizer | 0–200 | 0–175 |
| Filler | 25–250 | 50–200 |
| Pigment | 0–40 | 5–30 |
| Stabilizer | 0–10 | 0.5–5 |
| Solvent | 0–300 | 25–250 |

Example

The following inventive and comparative runs were conducted on sealants formulated according to the following recipe.

| Recipe | |
|---|---|
| Ingredient | Parts by Weight |
| Block copolymer[1] | Var. |
| Hydrogenated teleblock copolymer[2] | Var. |
| VT/AMS[3] (modifying resin) | 54.25 |
| Methyl ester of rosin (plasticizer) | 21 |
| Dibutyl phthalate (plasticizer) | 21 |
| Calcium carbonate (filler) | 59.5 |
| Talc (filler) | 35 |
| Titanium dioxide (pigment) | 10 |

-continued

| Ingredient | Recipe Parts by Weight |
|---|---|
| Toluene (solvent) | 110 |

[1] 60/40 Butadiene/styrene radial teleblock copolymer coupled with silicon tetrachloride. M.W. - 300,000 (weight average).
[2] Hydrogenated 70/30 butadiene/styrene teleblock copolymer coupled with epoxidized soybean oil. M.W. - 95,000 (weight average).
[3] Vinyl toluene/alpha-methyl styrene copolymer (Piccotex 120 from Pennsylvania Industrial Chemicals).

In Table I data are tabulated which were obtained on sealants formulated according to the above recipe. Run 1 (comparative) utilized a sealant based on the butadiene/styrene radial teleblock copolymer. Run 2 (comparative) utilized a sealant based on the hydrogenated butadiene/styrene radial teleblock copolymer. Run 3 (inventive) utilized a sealant based on a mixture of the two copolymers.

TABLE I

| Run | 1 | 2 | 3 |
|---|---|---|---|
| Block copolymer, parts by weight | 54.25 | 0 | 18.2 |
| Hydrogenated teleblock copolymer, parts by weight | 0 | 54.25 | 36.1 |
| Bulk viscosity, centipoise[1] | 728,000 | 2,240,000 | 162,000 |
| After drying at 86° C for 16 hours | | | |
| 100% modulus, psi[2] | 91 | 37 | 55 |
| 50% modulus, psi[2] | 96 | 46 | 59 |
| Elongation, %[2] | 438 | 150 | 238 |
| Tensile, psi[2] | 102 | 46 | 59 |
| Hardness, Shore A[3] | 62 | 40 | 55 |
| Canvas peel strength[4], pounds per inch width | 18 | 17 | 22 |

[1] Measured with Brookfield Viscometer at 25° C at 0.5 to 5 rpm with No. 7 spindle.
[2] ASTM D-888-56T.
[3] ASTM D-2240-68.
[4] Specimens prepared and tested according to National Bureau of Standards Federal Specification TT-S-230b.

The data in Table I show that the bulk viscosity of the formulation of inventive Run 3 is much lower than the comparative formulation based on the individual polymers. It is also observed that the canvas peel strength of the inventive formulation is higher than for either comparative formulation even though the other properties of the inventive sealant are approximately intermediate between the formulations based on the individual polymers. The peel strength gives an indication of the extent to which the sealant will stick to the sides of the crack it is sealing. Yet after curing the inventive sample was not tacky.

While this invention has been described in detail for the purpose of illustration, it is not to be construed as limited thereby but is intended to cover all changes and modifications within the spirit and scope thereof.

We claim:
1. A sealant composition comprising:
  5-50 parts by weight of an unsaturated block copolymer of a conjugated diene and a monovinyl-substituted aromatic compound;
  50-95 parts by weight of a teleblock copolymer of a formula selected from ABA and $(AB)_nY$ wherein A represents a block of a polymerized monovinyl-substituted aromatic component, B represents a block of a polymerized conjugated diene before hydrogenation, said teleblock copolymer being hydrogenated to the extent that only 5 percent or less of the original olefinic unsaturation remains, and 5 percent or less of the monovinyl-substituted aromatic component unsaturation has been removed, Y represents a residue of a polyfunctional coupling agent or a polyfunctional initiator, and $n$ is an integer having a value of from 2 to 4;
  10–300 parts by weight of a modifying resin; and
  25–250 parts by weight of a filler.
2. A composition according to claim 1 wherein said unsaturated block copolymer is a thermoplastic elastomer.
3. A composition according to claim 2 wherein said unsaturated and said hydrogenated teleblock copolymers each have a weight ratio of monovinyl-substituted aromatic compound/conjugated diene within the range of 40/60 to 15/85.
4. A composition according to claim 3 wherein said monovinyl-substituted aromatic compound of said unsaturated block copolymer and said monovinyl-substituted aromatic compound of said hydrogenated teleblock copolymer is styrene and said conjugated diene compound of said unsaturated block copolymer and said hydrogenated teleblock copolymer is selected from 1,3-butadiene and isoprene.
5. A composition according to claim 1 wherein said hydrogenated teleblock copolymer has an unsaturation of less than 2 percent of the original olefinic unsaturation.
6. A composition according to claim 3 wherein said unsaturated block copolymer is present in an amount within the range of 25 to 40 parts by weight, said hydrogenated teleblock copolymer is present in an amount within the range of 60 to 75 parts by weight, said modifying resin is present in an amount within the range of 25 to 150 parts by weight, and said filler is present in an amount within the range of 50 to 200 parts by weight.
7. A composition according to claim 6 wherein said modifying resin is selected from the group consisting of modified rosin and rosin esters, esters of polymerized rosin, polyterpene resins, terpene-phenolic resins, coumarone-indene resins, diolefin-olefin resins, phenol-aldehyde resins, and alpha-methyl styrene copolymers, and said filler is selected from calcium carbonate, aluminum silicate, clay, talc, kaolin, barytes, mica, and silica.
8. A composition according to claim 4 comprising in addition a solvent to give a solvent-type sealant formulation.
9. A composition according to claim 8 wherein said modifying resin is a vinyl toluene/alpha-methyl styrene copolymer, said filler is calcium carbonate, and said solvent is toluene.
10. A composition according to claim 1 comprising in addition 25 to 250 parts by weight per 100 parts by weight of total block copolymers of a solvent.

* * * * *